US012620236B2

(12) United States Patent
Matsushita

(10) Patent No.: US 12,620,236 B2
(45) Date of Patent: May 5, 2026

(54) DATA PROCESSING SYSTEM, DATA PROCESSING METHOD, AND INFORMATION PROVIDING SYSTEM

(71) Applicant: Faurecia Clarion Electronics Co., Ltd., Saitama (JP)

(72) Inventor: Yuki Matsushita, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 9 days.

(21) Appl. No.: 18/338,669

(22) Filed: Jun. 21, 2023

(65) Prior Publication Data

US 2024/0037956 A1 Feb. 1, 2024

(30) Foreign Application Priority Data

Jul. 29, 2022 (JP) ................................. 2022-122320

(51) Int. Cl.
*G06V 20/56* (2022.01)
*G01C 21/34* (2006.01)
(Continued)

(52) U.S. Cl.
CPC ......... *G06V 20/56* (2022.01); *G01C 21/3407* (2013.01); *G06F 3/017* (2013.01);
(Continued)

(58) Field of Classification Search
CPC ........ G06V 20/56; G06V 20/59; G06V 40/28; G01C 21/3407; G06F 3/017; G06F 3/167;
(Continued)

(56) References Cited

U.S. PATENT DOCUMENTS

2013/0030811 A1* 1/2013 Olleon .................... G06F 3/011
348/148
2014/0278068 A1* 9/2014 El Dokor ................ G06F 3/167
701/461

FOREIGN PATENT DOCUMENTS

JP 2007-080060 A 3/2007
JP 2009031065 A 2/2009
(Continued)

OTHER PUBLICATIONS

Japanese Office Action issued on Mar. 24, 2026 for Japanese Patent Application No. 2022-122320.

*Primary Examiner* — Girumsew Wendmagegn
(74) *Attorney, Agent, or Firm* — Volpe Koenig

(57) ABSTRACT

A data processing system efficiently identifies a target object pointed to by a vehicle occupant. The data processing system provides a position detection unit that detects the position of the vehicle; an occupant state recognition unit that recognizes motion of an occupant pointing to outside of the vehicle; a target object database that indicates position of target objects that may be pointed to by an occupant; an appearance feature database that indicates appearance features of the target object; a speech recognition unit that recognizes words indicative of appearance features from the speech of the occupant; an object recognition unit that extracts target object candidates pointed at by the occupant by searching the target object database and the appearance feature database using a direction pointed at by an occupant, and a word included in the speech recognized by the speech recognition unit; and an output unit that outputs target object candidates.

10 Claims, 7 Drawing Sheets

(51) Int. Cl.

| | |
|---|---|
| *G06F 3/01* | (2006.01) |
| *G06T 7/20* | (2017.01) |
| *G06T 7/70* | (2017.01) |
| *G06V 20/59* | (2022.01) |
| *G10L 15/08* | (2006.01) |

(52) U.S. Cl.
  CPC .................. *G06T 7/20* (2013.01); *G06T 7/70*
    (2017.01); *G06V 20/59* (2022.01); *G10L 15/08*
    (2013.01)

(58) Field of Classification Search
  CPC .... G06F 2203/0381; G06F 3/011; G06T 7/20;
      G06T 7/70; G10L 15/08; G10L 2015/223;
      B60K 2360/1438; B60K 2360/148; B60K
        2360/162; B60K 2360/164; B60K
        2360/166; B60K 2360/191; B60K
      2360/21; B60K 35/10; B60K 35/22;
        B60K 35/28
  See application file for complete search history.

(56)           References Cited

FOREIGN PATENT DOCUMENTS

| | | | |
|---|---|---|---|
| JP | 2015524096 A | 8/2015 |
| JP | 2020144552 A | 9/2020 |
| WO | 2013166190 A2 | 11/2013 |

* cited by examiner

| Candidate ID | Exterior Characteristics | Relative Characteristics | Object Information (Name, Opening Hours, Event, etc.) |
|---|---|---|---|
| T1 | ·Tokyo Tower<br>·Tower<br>·Tall<br>·Red | ·Appears Far Away | : |
| T2 | ·Tall<br>·With Different Colors | ·Right Side of Tokyo Tower | : |
| T3 | ·Tall<br>·Strange Shape Blue | ·Appears Near | : |

DATA PROCESSING SYSTEM, DATA PROCESSING METHOD, AND INFORMATION PROVIDING SYSTEM

TECHNICAL FIELD

The present invention relates to a data processing system, a data processing method, and an information providing system.

BACKGROUND TECHNOLOGY

Conventionally, there is a technology for identifying target objects pointed to by a user who is occupant of a vehicle. For example, Patent Document 1 states, "a target object identifying device that accurately identifies a target object that exists in a direction to which a user's hand or finger is pointing is provided," and also states that "positioning unit 13 detects a current vehicle position and vehicle orientation. An imaging unit 18 images the surroundings of the vehicle. A pointing direction detection unit 16 detects a pointing direction pointed toward by the user in the vehicle using their hand. A target object extraction unit extracts target objects that exist in the indicated direction detected by the pointing direction detection unit 16 from the image captured by the imaging unit 18. The target object position identification unit identifies the position of the target object extracted by the target object extraction unit with respect to the vehicle."

PRIOR ART DOCUMENTS

Patent Documents

[Patent Document 1] JP2007080060 A

SUMMARY OF THE INVENTION

Problem to the Solved by the Invention

With the conventional technology, it is difficult to identify the target object intended by the user when there are a plurality of candidates for the target object in the direction pointed toward by the user. In particular, when pointing far away, there may be target object candidates in front of or behind, as well as to the left or the right of the pointing direction and the recognized position. When there are a plurality of target object candidates, the candidates are enumerated and presented to the occupant, and thus the target object intended by the user can be identified if a selection operation is received from the occupant. However, insufficient narrowing down of candidates will force the occupant to perform cumbersome decisions and operations. In-vehicle devices should not use an interface that requires cumbersome operations, as this may compromise safe driving.

Therefore, an object of the present invention is to efficiently identify target objects pointed to by an occupant of a vehicle.

Means for Solving the Problem

In order to achieve the aforementioned target object, a representative data processing system of the present invention provides: a position detection unit that detects the position of the vehicle; an occupant state recognition unit that recognizes motion of an occupant of the vehicle point-ing to outside of the vehicle; a target object database that indicates position of target objects that may be pointed to by an occupant; an appearance feature database that indicates appearance features of the target object; a speech recognition unit that recognizes words indicative of appearance features from the speech of the occupant; an object recognition unit that searches the target object database and the appearance feature database using a direction pointed at by an occupant, and a word included in the speech recognized by the speech recognition unit, to extract target object candidates pointed at by the occupant; and an output unit that outputs the target object candidates.

Effects of the Invention

An object of the present invention is to efficiently identify target objects pointed to by an occupant of the vehicle. The following description of embodiments will elucidate the problems, configurations, and effects other than those described above.

EMBODIMENTS OF THE INVENTION

Next, embodiments of the present invention will be described using the drawings.

Embodiment 1

Figure 1:
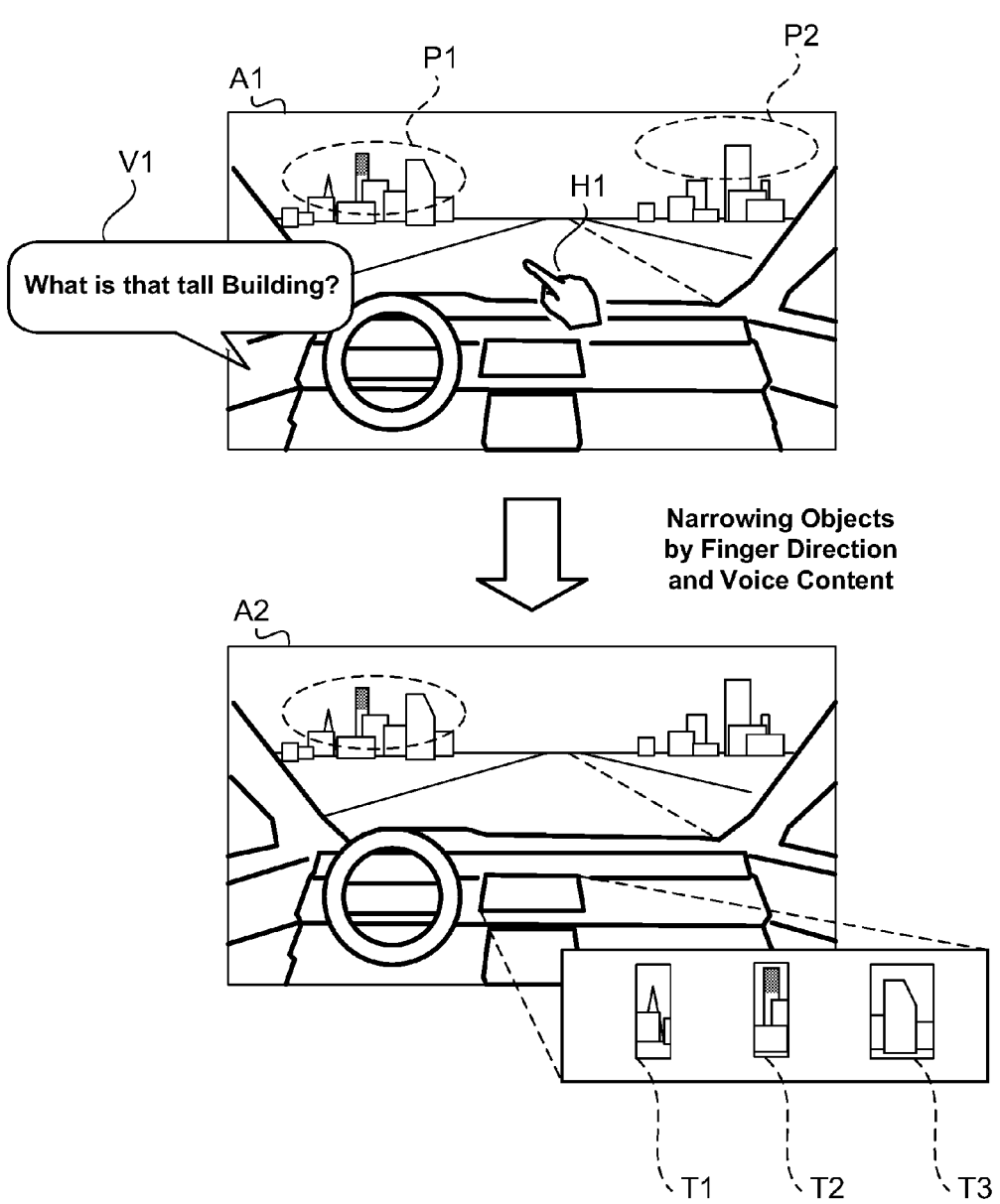
FIG. 1 is an explanatory diagram depicting an overview of data processing of Embodiment 1.

FIG. 1 is an explanatory diagram depicting an overview of data processing of Embodiment 1. FIG. 1 depicts a user, who is an occupant of a vehicle, pointing outside the vehicle. The data processing device 10 provided in the vehicle is equipped with an interior camera that captures images of the interior of the vehicle and an exterior camera that captures images of the surroundings of the vehicle.

The data processing device 10 acquires images from the interior camera, analyzes the images to identify the eye position and finger position of the occupant, and determines that a straight line connecting the eye position and fingertip is the pointing direction. Herein, the term "finger" is used to include at least one of the hands and fingers. However, there is some error in the determination made by the data processing device 10, and since the occupant is driving, the pointing direction by the occupant may not always be accurate. In other words, there may be discrepancy between the pointing direction recognized by the data processing device 10 and the direction intended by the occupant. Therefore, the data processing device 10 determines the pointing direction of the occupant as regions P1 and P2 based on a degree of width.

The data processing device 10 refers to map data and identifies target objects located in the direction pointed to by the occupant. For example, if an occupant points to a building near his vehicle, there is a high possibility that the occupant can uniquely identify the building located in the pointed direction. Even if the occupant points at a building far from the vehicle, for example, if the pointing direction is in region P2 in FIG. 1, the building pointed at by the occupant can be uniquely identified because there are no other buildings in the surrounding region.

However, if, for example, the identified region determined by the pointing direction of the occupant's hand H1 is region P1, there are a plurality of target object candidates. This is because buildings appear to be densely packed in front of, behind, and to the left and right of the building that was actually intended by the user. Thus, when the pointing direction alone does not sufficiently narrow down the target building, sequential listing of candidates forces the occupant to make cumbersome decisions and operations to select the intended building from a plurality of candidates. Furthermore, if the occupant is the driver, the driver may abandon selecting of the intended building because the time required to make decisions and operate the system may compromise safe driving.

Therefore, the data processing device 10 recognizes the speech of the occupant and narrows down the target based on the pointing direction and the content of the speech. In state A1 of FIG. 1, the occupant points to region P1 with a hand H1 and states as speech V1, "What is that tall building?"

The data processing device 10 recognizes the word "tall", which indicates a feature of the appearance of the target object, from the speech V1 and narrows down the target object candidates. As a result, in state A2, there are three target candidates: T1 through T3.

The data processing device 10 extracts images of candidates T1 to T3 from the images captured by the exterior camera and displays those images on the display unit. The occupant can select the intended target object from these candidates. Thus, by using speech recognition to sufficiently narrow down the candidates, the target object pointed to by the occupant can be efficiently identified.

Figure 2:
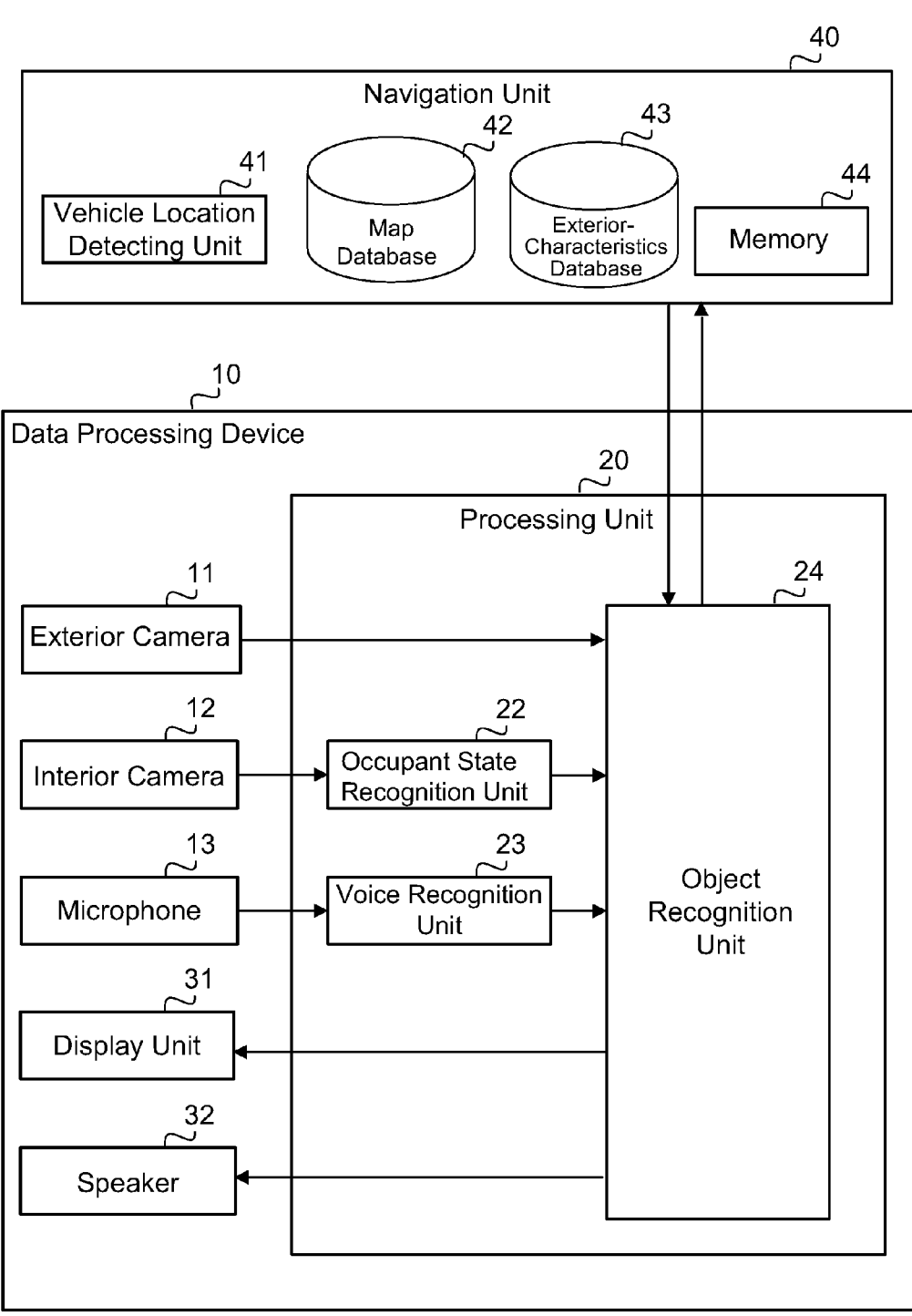
FIG. 2 is a configuration diagram of the data processing device of Embodiment 1.

FIG. 2 is a configuration diagram of the data processing device 10 of Embodiment 1. The data processing device 10 is connected to the navigation unit 40. The navigation unit 40 is a unit that searches for and guides the route of the vehicle. The navigation unit 40 has a vehicle position detection unit 41, a map database 42, an appearance feature database 43, and a storage unit 44.

The vehicle position detection unit 41 receives signals from, for example, a satellite, and detects the vehicle position and direction of travel. The map database 42 includes data on roads as well as the position and names of buildings, and the like. Therefore, the map database 42 can be used as a target object database that indicates the position of target objects that may be pointed to by the occupant. The appearance feature database 43 includes data indicating appearance features of the target object. Appearance features are indicated by the words the occupant uses to describe the building, such as tall, red, long, or the like. The appearance feature database 43 may be integrated with the map database 42. The storage unit 44 stores information such as destinations and routes set by the occupant, previously set history, locations registered by instructions from the occupant, and the like.

The data processing device 10 has an exterior camera 11, interior camera 12, microphone 13, display unit 31, speaker 32, and processing unit 20. The exterior camera 11 is an imaging device that images the surroundings of the vehicle. The interior camera 12 is an imaging device that captures images of the vehicle interior and functions as a sensor to acquire the status of the occupant in the vehicle cabin. The microphone 13 collects sound in the cabin. The display unit 31 performs display output to the occupant. The display unit 31 may be configured with an input unit such as a touch panel display. The speaker 32 provides speech output to the occupant.

The interior camera 12 is installed in a position capable of imaging the eyes and hands of the occupant. For example, the interior camera can be installed near the rear view mirror, the dome light, or the like.

The processing unit 20 has an occupant state recognition unit 22, a speech recognition unit 23, and an object recognition unit 24. When the processing unit 20 is achieved using a computer, the CPU (Central Processing Unit) executes a program to perform the functions of the occupant state recognition unit 22, speech recognition unit 23, and object recognition unit 24.

The occupant state recognition unit 22 acquires images captured by the interior camera 12 and recognizes the state of the vehicle occupants based on those images. The occupant state recognized by the occupant state recognition unit 22 includes actions of pointing outside of the vehicle. The occupant state recognition unit 22 identifies the direction pointed to by the occupant by recognizing the position of the eyes and fingers of the occupant. The occupant state recognition unit 22 outputs the recognition results to the object recognition unit 24.

The speech recognition unit 23 recognizes words that indicate appearance features from the speech of the occupant. The speech recognition unit 23 also recognizes words that indicate relative features. Relative features are features that indicate the relative positional relationship of buildings. For example, when there are a plurality of target object candidates, these words express the relative position of the target object compared to the plurality of candidates, such as "on the right," "in front of," "farther away," or the like.

The object recognition unit 24 extracts target object candidates pointed at by the occupant based on the direction pointed at by the occupant as recognized by the occupant state recognition unit 22 and the words included in the speech recognized by the speech recognition unit 23.

First, the object recognition unit 24 matches the position and direction of travel of the vehicle detected by the vehicle position detection unit 41, the direction pointed at by the occupant recognized by the occupant state recognition unit 22, and the target objects stored in the map database 41, and extracts target object candidates in the direction pointed at by the occupant. In this case, the object recognition unit 24 extracts the target object candidates based on the condition that the relative positional relationship of each target object is within the view of the occupant (at the vehicle position). For example, a building that is not visible to the occupant due to being blocked from the line of sight by a building in the foreground is not a target object candidate.

The object recognition unit 24 narrows down the candidate group that was extracted based on the direction pointed at by the occupant, using words included in the speech. Specifically, the object recognition unit 24 narrows down the candidates using words that indicate appearance and relative features. For words that indicate appearance characteristics, comparing the words in the speech with those registered in the appearance feature database 43 is sufficient. Relative features can be determined beforehand based on the relative positional relationship with the candidate group and then compared with the words in the speech.

The object recognition unit 24 outputs the narrowed down candidates using the display unit 31 and the speaker 32. In other words, the display unit 31 and the speaker 32 operate as output units.

When the display unit 31 outputs a plurality of candidates, the display unit 31 displays side by side the images of the plurality of candidates extracted from the images captured by the exterior camera 11. The occupant selects the intended building from the displayed images. This selection may be accepted by the touch panel or by recognizing a finger pointing at the candidate images displayed by the display unit 31. Note that the candidate images that are displayed may be images previously stored in the map database 42 or the appearance feature database 43.

If the speaker 32 outputs the candidates, the speaker 32 outputs audio expressing a candidate target object using words that indicate features of the target object that is the candidate that are not included in the speech of the occupant, and requests confirmation by the occupant. For example, for a candidate that has "tall" and "blue" as appearance features, if "tall" is already in the speech of the occupant, the speaker 32 will request confirmation from the occupant by outputting speech asking, "Is it a blue building?" At this point, it is possible to prioritize a plurality of candidates by evaluating the likelihood of being intended by the user, and confirming the candidates starting with the candidate having the highest priority. Thus, a dialogue interface between the occupant and the data processing device 10 can be achieved by using a plurality of features associated with the target object.

If the data processing device 10 uniquely identifies the target object pointed at by the occupant based on the selection operation or confirmation speech of the occupant, information about the target object can be provided. Furthermore, the identified target object can also be designated as a destination and used for route searching by the navigation unit 40.

Figure 3:
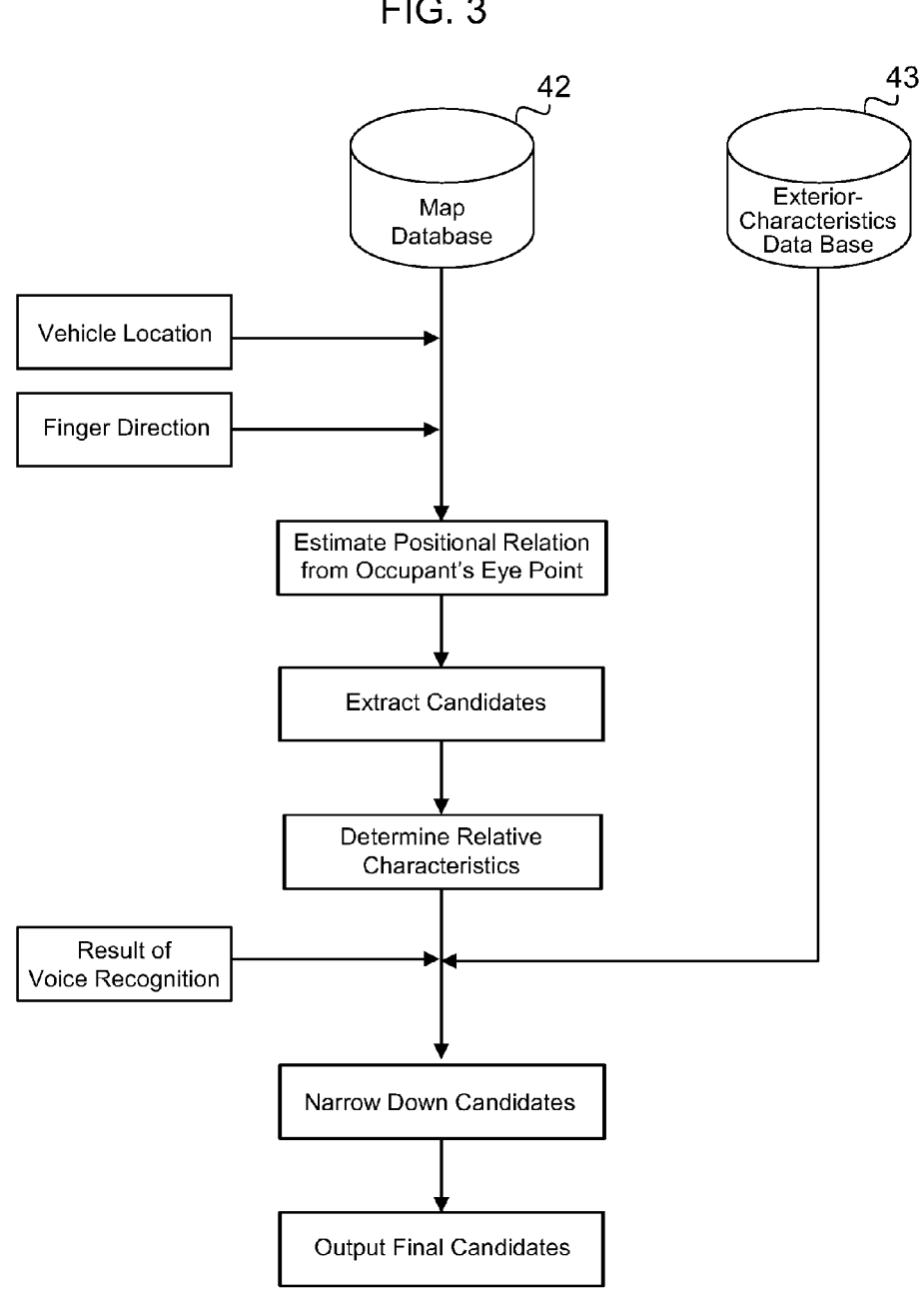
FIG. 3 is an explanatory diagram for determining target object candidates.

FIG. 3 is an explanatory diagram for determining target object candidates. First, the object recognition unit 24 estimates the positional relationship with the building from the viewpoint of the occupant using the vehicle position, the pointing direction, which is the direction pointed at by the occupant, and the map database 42. The object recognition unit 24 extracts buildings that exist in the pointing direction and are visible to the occupant as a candidate group. In other words, buildings that are in the shadow of a building in the foreground and not visible to the occupant are excluded from the candidates. Furthermore, the object recognition unit 24 determines the features that indicate the relative positional relationship of the buildings in the candidate group and associates them with corresponding buildings as relative features.

The object recognition unit 24 narrows down the candidate group extracted in the pointing direction using the results of speech recognition. Specifically, the object recognition unit 24 uses the results of speech recognition and the relative features and appearance feature database 43 to narrow down the candidates from the candidate group, on a condition that the words in the speech are associated as features. After narrowing down, the object recognition unit 24 outputs the final candidate.

Figure 4:
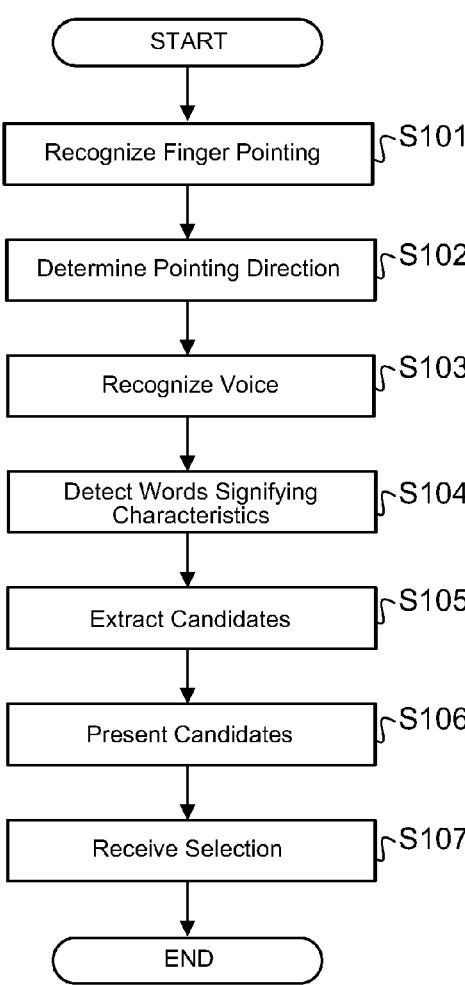
FIG. 4 is a flowchart depicting the processing steps of the data processing device.

FIG. 4 is a flowchart depicting the processing steps of the data processing device 10. First, the occupant state recognition unit 22 recognizes finger pointing by the occupant using images captured by the interior camera 12 (step S101).

The object recognition unit 24 determines the pointing direction from the eye and hand positions of the occupant (step S102). The speech recognition unit 23 recognizes the speech captured by the microphone 13 and detects words that indicate features (step S104).

The object recognition unit 24 extracts target objects in the rear based on the pointing direction, vehicle position, map database 42, appearance feature database 43, and speech recognition results (step S105), and presents the extracted candidates to the occupant by outputting the candidates (step S106). Furthermore, an operation to select the target intended by the occupant from the plurality of candidates is accepted (step S107), and the process is terminated.

Figure 5:
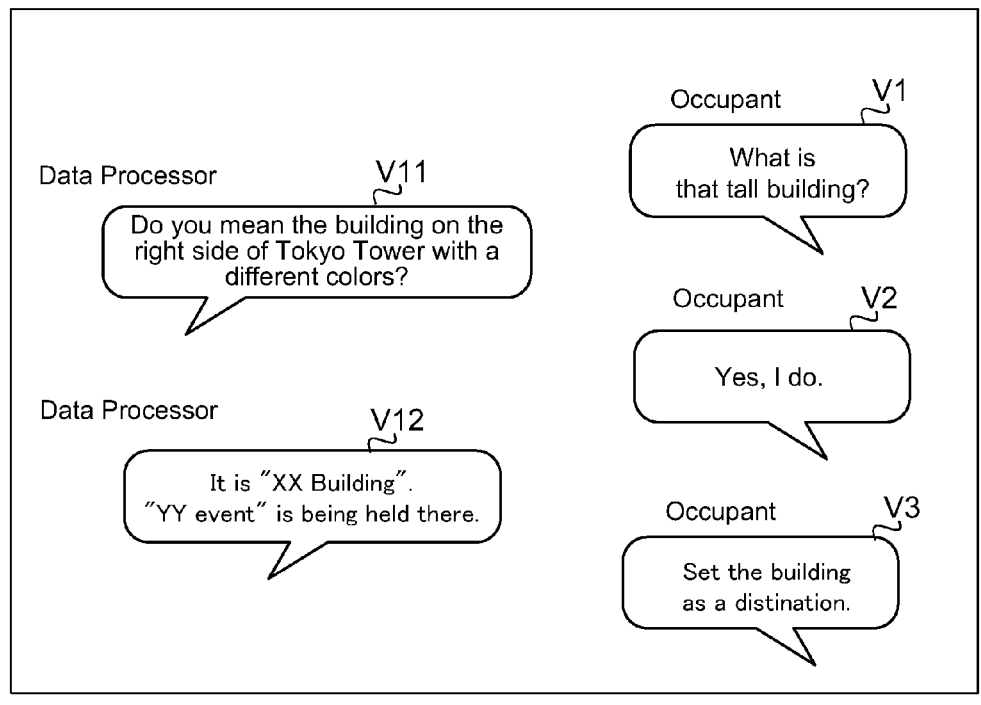
FIG. 5 is an explanatory diagram of the interface between dialogue and the features of the target object.

FIG. 5 is an explanatory diagram of the interface between dialogue and the features of the target object. In FIG. 5, candidate IDs, appearance features, relative features, and target object information are associated with the target object candidates. The candidate ID is an identification information of the target object candidate. Appearance features are words used to describe a target object. In FIG. 5, "Tokyo Tower", "tower", "tall", and "red" are associated with candidate ID "T1" as appearance features. In addition, "tall" and "different color from the middle" are associated with candidate ID "T2" as appearance features. The candidate ID "T3" is associated with "tall", "oddly shaped", and "blue" as appearance features.

Appearance features typically include words indicating color and shape. Herein, "Tokyo Tower" is the name of the building, but it is also registered as an appearance feature. This is because a landmark with a prominent and distinctive shape, such as the Tokyo Tower, is easily identified by name from the appearance, and thus the name itself functions as an appearance feature.

Appearance features, for example, can be associated by collecting and analyzing frequently used words for target objects in the map database 42.

In FIG. 5, "appears far away" is associated with candidate ID "T1" as a relative feature. Furthermore, for the candidate ID "T2", "right side of Tokyo Tower" is associated as a relative feature. Furthermore, "appears far away" is associated with candidate ID "T3" as a relative feature. Thus, relative features indicate the relative positional relationship of the buildings in the candidate group. Furthermore, it is also possible to use appearance features of other candidates, such as "to the right side of Tokyo Tower".

The target object information is a variety of information about the target object that can be provided to the occupant, such as the name, hours of operation, events, and the like of the target object.

An example of a dialogue using these features is described below. First, the occupant points and asks, "What's that tall building?" (speech V1). The data processing device 10 extracts a target object in the pointing direction based on the word "tall", and determines the candidate ID "T2" is the highest priority candidate. The data processing device 10 then asks, "Is that the building that appears to the right of Tokyo Tower and has a different color?" The speech V11 describes candidate ID "T2" using words other than "tall" which was used by the occupant, from among the appearance features and relative features of candidate ID "T2", and requests confirmation by the occupant.

In response to speech V11, the occupant responds, "Yes" (speech V2). The speech V2 establishes that the candidate ID "T2" is the target object intended by the occupant. Next, the data processing device 10 responds, "That is the 'XX Building'. Furthermore, the unit states "Event YY is underway" (speech V12). This speech V12 provides the occupant with the target object information for candidate ID "T2". The occupant confirms speech V12 and states, "Set that building as the destination" (speech V3). As a result, the data processing device 10 instructs the navigation unit 40 to set a route with the building of candidate ID "T2" as the destination.

Furthermore, although not depicted in the figures, the occupant may say, "I'm going there next time, so register that building" as speech V3 in response to speech V12. In that case, the data processing device 10 instructs the navigation unit 40 to register the building with candidate ID "T2" as a location in the storage unit 44. The occupant can later operate the navigation unit 40 to call up the building with the registered candidate ID "T2" and set a route with that building as the destination.

The previous explanations illustrated a configuration in which the data processing device 10 installed in a vehicle operates as a data processing system using the functions of the navigation unit 40. In other configurations, the data processing device may be equipped with some or all of the functions and configurations of the navigation unit 40. Furthermore, a configuration that operates as a data processing system with the in-vehicle devices and server communicating with each other.

Figure 6:
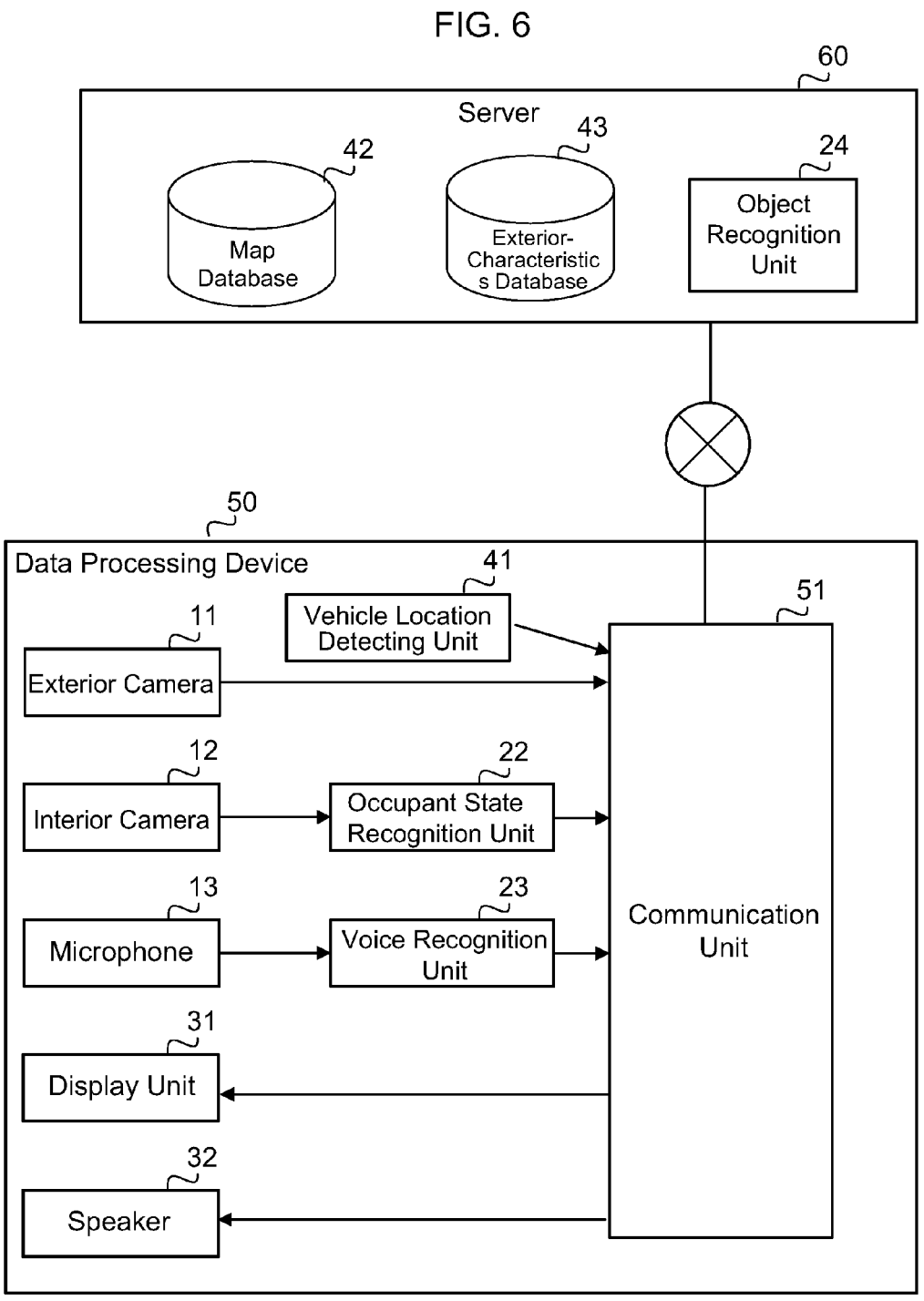
FIG. 6 is an explanatory diagram of a modified example that includes an in-vehicle device and a server.

FIG. 6 is an explanatory diagram of a modified example that includes an in-vehicle device and a server. The data processing device 50 is an in-vehicle device and has an exterior camera 11, interior camera 12, microphone 13, display unit 31, speaker 32, occupant state recognition unit 22, speech recognition unit 23, vehicle position detection unit 41, and communication unit 52.

The communication unit 51 communicates with the server 60 via a network. The server 60 contains map data 42, appearance feature data 43, and object recognition unit 24. Thus, although the components are distributed between the data processing device 50 and the server 60, the system depicted in FIG. 6 has the same components as in FIG. 2 and operates in the same manner.

As described above, the disclosed data processing system provides a vehicle position detection unit 41 as the position detection unit that detects the position of the vehicle, an occupant state recognition unit 22 that recognizes motion of an occupant of the vehicle pointing to outside of the vehicle, a target object database 42 that indicates position of target objects that may be pointed to by an occupant, an appearance feature database 43 that indicates appearance features of the target object, a speech recognition unit 23 that recognizes words indicative of appearance features from the speech of the occupant, an object recognition unit 24 that searches the target object database 42 and the appearance feature database 43 using a direction pointed at by an occupant, and a word included in the speech recognized by the speech recognition unit, to extract target object candidates pointed at by the occupant; and an output unit (display unit 31 or speaker 32) that outputs the target object candidates.

This configuration and its operation allow the data processing system to efficiently identify target objects pointed to by the vehicle occupant.

The object recognition unit 24 estimates the relative positional relationship of the target object from the viewpoint of the occupant using detection results of the position detection unit and the position of the target object stored in the target object database, and extracts a candidate target object on the condition that they are visible to the occupant.

Thus, target objects that are not visible to the occupant can be excluded, and the target objects can be extracted efficiently.

The object recognition unit 24 estimates the relative positional relationship of the target object from the viewpoint of the occupant using detection results of the position detection unit and the position of the target object stored in the target object database, and determines the relative positional relationship of the target object as a relative feature. The speech recognition unit 23 further recognizes relative features; and the object recognition unit 24 further extracts target object candidates using the relative features.

Thus, the target object can be narrowed down by using speech about the relative positional relationship of the target objects.

The output unit displays the target object candidates and accepts selections from the occupant. This allows the occupant to select from a sufficiently narrowed down list of candidates and easily identify the target object.

The output unit outputs a voice expressing a candidate target object using words that indicate features of the target object that are not included in the occupant's speech, and requests confirmation by the occupant.

This allows the target object to be identified through dialogue with the occupant.

The target object database can be a map database used to find and guide a route for the vehicle. The configuration may provide communication between a server with the object recognition unit 24 and the vehicle. This configuration can lighten the processing load on the in-vehicle devices. Each of the elements composing the server 60 need not necessarily reside on a single server, but may be distributed across a plurality of servers.

Figure 7:
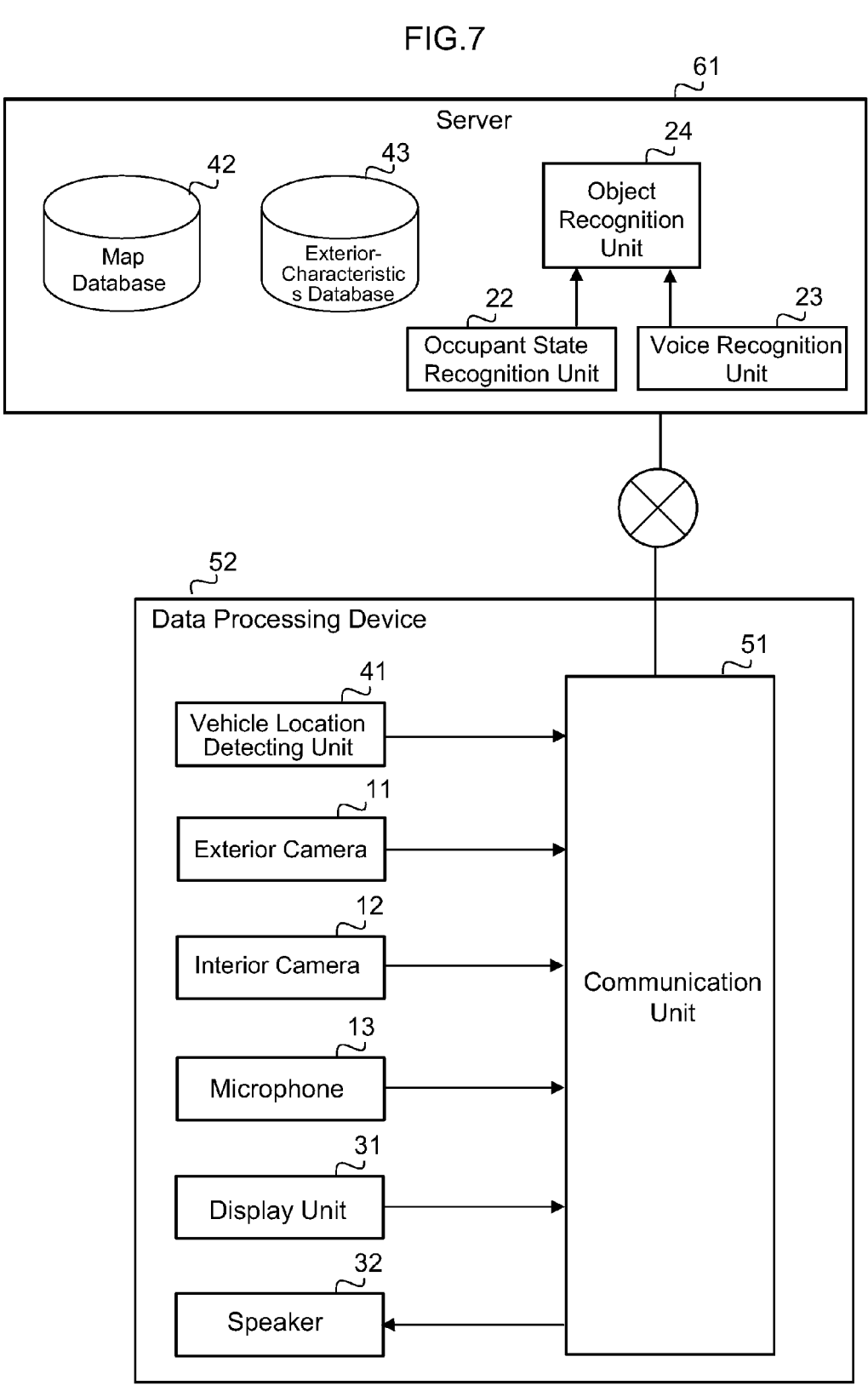
FIG. 7 is an explanatory diagram of another modified example that includes an in-vehicle device and a server.

FIG. 7 is an explanatory diagram of another modified example that includes an in-vehicle device and a server. The data processing device 51 is an in-vehicle device and has an exterior camera 11, interior camera 12, microphone 13, display unit 31, speaker 32, vehicle position detection unit 41, and communication unit 52. The server 61 contains map data 42, appearance feature data 43, occupant state recognition unit 22, speech recognition unit 23, and object recognition unit 24. Thus, although the components are distributed between the data processing device 52 and the server 61, the system depicted in FIG. 7 has the same components as in FIG. 2 and operates in the same manner.

The occupant state recognition unit 22, speech recognition unit 23, and object recognition unit 24 are provided in the server 61, and all recognition processes are performed by the server 61. The data processing device 52 transmits the image data captured by the interior camera 12 and the speech data collected by the microphone 13 to the server 61 via the communication unit 51. The occupant state recognition unit 22 provided in the server 61 recognizes the state of the vehicle occupant by means of the video data received from the data processing device 51. The speech recognition unit 23 provided on the server 61 recognizes words that indicate appearance features from the speech data received from the data processing device 51. The object recognition unit 24 transmits information including target object candidates to the communication unit 51, and the communication unit 51 outputs the received information to the display unit 31 and the speaker 32. With this configuration, all recognition processing is performed by the server 61, and the data processing device 50 only collects data, further reducing the processing load on the in-vehicle devices. Each of the elements composing the server 61 need not necessarily reside on a single server, but may be distributed across a plurality of servers.

Note that the present invention is not limited to the abovementioned embodiments but includes various modifications. For example, while the abovementioned embodiments have been described in detail in order to describe the present invention in an easy-to-understand manner, the present invention is not necessarily limited to those with all the described configurations. Moreover, not only the deletion of such configurations, but also the replacement or addition of configurations is possible.

For example, if there are other occupants besides the driver, the present invention may be applied to the other occupants. A specific occupant among the plurality of occupants may also be designated as the occupant to whom the present invention is applied.

The status of the occupant may also be acquired from an arbitrary sensor other than the interior camera, such as LIDAR (Light Detection and Ranging, Laser Imaging Detection and Ranging), a stationary smartphone, or the like. Furthermore, the outputs of a plurality of sensors and a plurality of types of sensors can be combined.

Furthermore, in the above embodiment, a line extending from the eyes and fingertips was determined as the direction in which the occupant is pointing, but it is also possible to recognize two points on the fingers and determine that a line extending between these two points is the direction in which the occupant is pointing.

DESCRIPTION OF SYMBOLS

10: Data processing device, 11: Exterior camera, 12: Interior camera, 13: Microphone, 20: Processing unit, 22: Occupant recognition unit, 23: Speech recognition unit, 24: Object recognition unit, 31: Display unit, 32: Speaker, 40: Navigation unit, 41: Vehicle position detection unit, 42: Map database, 43: Appearance feature database, 44: Storage unit, 50: Data processing device, 60: Server

The invention claimed is:

1. A system for multi-modal object identification, the system comprising:

an interior camera that captures images of an interior of a vehicle including an occupant of the vehicle;

an exterior camera that captures images of an area adjacent to an exterior of the vehicle;

a microphone that captures sounds in the interior of the vehicle including words spoken by the occupant of the vehicle;

a memory that stores a database of objects, wherein the database of objects includes, for each respective object, words describing an appearance of the respective object and a geographic position of the respective object; and one or more processors communicatively coupled to the interior camera, the exterior camera, the microphone, and the memory, wherein the one or more processors are collectively configured to:

recognize, using the interior camera, motion of the occupant of the vehicle pointing to outside of the vehicle, recognize, using the microphone, a word or phrase comprising one or more appearance descriptors spoken by the occupant, match the recognized appearance descriptor to appearance-descriptor words stored for respective objects in the database, extract target object candidates pointed at by the occupant by searching the database based on a geographic position of the vehicle, the motion of the occupant, and the matched appearance descriptor, and discarding objects that lack the matched appearance descriptor, and filtering to objects that would be visible from the occupant's viewpoint at the time of the utterance based on the geographic position of the vehicle and positions stored in the database, identify a specific target object among the target object candidates based on a dialogue with the occupant that outputs, for each candidate, a feature of that candidate that was not included in the word or phrase spoken by the occupant and receives a confirmation, utilizing the appearance of the respective target object, and output an indication of the specific target object to the occupant.

2. The system of claim 1, wherein the one or more processors are further collectively configured to:

estimate, from the occupant's viewpoint, a relative positional relationship of a target object using the geographic position and direction of the vehicle and positions stored in the database; and extract the target object candidates based on a condition that the target object would be visible to the occupant.

3. The system of claim 1, wherein the one or more processors are further collectively configured to:

estimate a relative positional relationship of the target object candidates from a viewpoint of the occupant;

recognize a word or a phrase that indicates the relative positional relationship of the target object candidates; and use the relative positional relationship to extract the target object candidates.

4. The system of claim 1, wherein the dialogue includes:

outputting audio expressing a respective target object candidate using words or phrases that indicate a feature of the respective target object candidate that was not included in the word or phrase spoken by the occupant, and in response to the audio, receiving a confirmation of the respective target object candidate as the specific target object.

5. The system of claim 1, wherein the memory further stores a map database used to find and guide a route for the vehicle.

6. A method for multi-modal object identification, the method comprising:

acquiring a position of a vehicle;

recognizing motion of an occupant of the vehicle pointing outside of the vehicle from image data captured inside the vehicle;

recognizing, from audio data collected in the vehicle, a word or phrase comprising one or more appearance descriptors spoken by the occupant;

matching the recognized appearance descriptor(s) to appearance-descriptor words stored for respective objects in a database that stores, for each respective object, a geographic position and appearance-descriptor words;

searching the database using a geographic position of the vehicle, a direction pointed to by the occupant, and the matched appearance descriptor;

extracting target object candidates pointed to by the occupant by discarding objects that lack the matched appearance descriptor(s) and filtering to objects that would be visible from the occupant's viewpoint at the time of the utterance based on the geographic position of the vehicle and positions stored in the database;

identifying a specific target object among the target object candidates based on a dialogue with the occupant that outputs, for each candidate, a feature not included in the recognized word or phrase and receives a confirmation; and outputting an indication of the specific target object to the occupant.

7. The method of claim 6, wherein the dialogue includes:

outputting audio expressing the respective target object using words or phrases that indicate a feature of the respective target object that was not included in the word or phrase spoken by the occupant and in response to the audio, receiving a confirmation of the respective target object as the specific target object from the occupant.

8. A system that communicates with a vehicle for performing multi-modal object identification, the system comprising:

a memory that stores a database of objects, wherein the database of objects includes, for each respective object, words describing an appearance of the respective object and a geographic position of the respective object;

a communication interface communicatively coupled to the vehicle via a communication network; and one or more processors communicatively coupled to the memory and the communication interface, wherein the one or more processors are collectively configured to:

receive, using the communication interface, audio data from a microphone located in the vehicle, wherein the microphone captures sounds in an interior of the vehicle including words spoken by an occupant of the vehicle, recognize, from the audio data, a word or phrase comprising one or more appearance descriptors spoken by the occupant, match the recognized appearance descriptor(s) to appearance-descriptor words stored for respective objects in the database, receive, using the communication interface, image data from an interior camera located in the vehicle, wherein the interior camera captures images of the interior of the vehicle including the occupant of the vehicle, recognize a direction of a pointing gesture by the occupant from the image data, extract target object candidates pointed at by the occupant by searching the database based on a geographic position of the vehicle, the pointing gesture of the occupant, and the matched appearance descriptor, and discarding objects that lack the matched appearance descriptor, identify a specific target object among the target object candidates based on a dialogue with the occupant that outputs, for each candidate, a feature of that candidate that was not included in the word or phrase spoken by the occupant and receives a confirmation, utilizing the appearance of the respective target object, and output, using the communication interface, an indication of the specific target object to the occupant.

9. The system of claim 8, wherein the one or more processors are collectively configured to:

estimate a relative positional relationship of the target object candidates from a viewpoint of the occupant using a geographic position of the vehicle and positions stored in the database; and extract the target object candidates based on a condition that the target object candidates would be visible to the occupant.

10. The system of claim 9, wherein the dialogue includes:

outputting audio expressing a respective target object using words or phrases that indicate a feature of the respective target object that was not included in the word or phrase spoken by the occupant and in response to the audio, receiving a confirmation of the respective target object as the specific target object from the occupant.

\* \* \* \* \*